United States Patent
Aben et al.

(10) Patent No.: US 11,096,411 B2
(45) Date of Patent: Aug. 24, 2021

(54) APPARATUS FOR COATING A FOOD PRODUCT WITH A BATTER

(71) Applicant: MAREL FURTHER PROCESSING B.V., Boxmeer (NL)

(72) Inventors: Eric Henricus Johannus Carolus Aben, Ledeacker (NL); Thomas Willem Dekker, Nijmegen (NL); Martinus Johannes Willebrordus Van Zoelen, 's-Hertogenbosch (NL); Johannes Martinus Meulendijks, Deurne (NL)

(73) Assignee: MAREL FURTHER PROCESSING B.V., Boxmeer (NL)

( * ) Notice: Subject to any disclaimer, the term of this patent is extended or adjusted under 35 U.S.C. 154(b) by 0 days.

(21) Appl. No.: 16/958,020

(22) PCT Filed: Dec. 20, 2018

(86) PCT No.: PCT/NL2018/050862
§ 371 (c)(1),
(2) Date: Jun. 25, 2020

(87) PCT Pub. No.: WO2019/132656
PCT Pub. Date: Jul. 4, 2019

(65) Prior Publication Data
US 2020/0390141 A1   Dec. 17, 2020

(30) Foreign Application Priority Data

Dec. 27, 2017   (NL) .................................... 2020183

(51) Int. Cl.
*A23P 20/12*   (2016.01)
*A23P 20/18*   (2016.01)
(Continued)

(52) U.S. Cl.
CPC ............... *A23P 20/12* (2016.08); *A23P 20/15* (2016.08); *A23P 20/18* (2016.08); *A23L 13/57* (2016.08);
(Continued)

(58) Field of Classification Search
CPC .......... A23P 20/12; A23P 20/15; A23P 20/18; A23P 2020/251; A23L 13/57; A23G 3/22;
(Continued)

(56) References Cited

U.S. PATENT DOCUMENTS 4,058,083 A * 11/1977 Miller ...................... B26D 7/34
118/16
2008/0283366 A1* 11/2008 Karpinsky ........... A21C 15/002
198/763

FOREIGN PATENT DOCUMENTS

CA   1089217 A   11/1980
DE   4212427 C1   4/1993
(Continued)

OTHER PUBLICATIONS

Search Report and Written Opinion from corresponding Dutch Application No. NL2020183, dated Aug. 15, 2018.
(Continued)

*Primary Examiner* — Laura Edwards
(74) *Attorney, Agent, or Firm* — Workman Nydegger

(57) ABSTRACT

An apparatus for coating a food product with a batter, includes a frame having a conveyor belt mounted on a rotatably driveable belt support member. The coating apparatus has a batter pump for pumping batter from a batter container towards an upper applicator positioned over the conveyor belt to form a stream of batter flow from the applicator to the conveyor belt to provide batter to an upper surface of the food product. The front roller is positioned at the food product entry section to provide a layer of batter on
(Continued)

the conveyor belt at the entry section by a thrust on the batter towards the entry section by the front roller and/or the conveyor belt. The coating apparatus comprises a batter overflow device positioned at the entry section and is mounted between the transport run and the return run of the conveyor belt.

12 Claims, 4 Drawing Sheets

(51) Int. Cl.
*A23P 20/15* (2016.01)
*A23L 13/50* (2016.01)
*A23P 20/25* (2016.01)
*B05C 3/10* (2006.01)
*B05C 5/00* (2006.01)

(52) U.S. Cl.
CPC ............ *A23P 2020/251* (2016.08); *B05C 3/10* (2013.01); *B05C 5/008* (2013.01)

(58) Field of Classification Search
CPC ........ A23G 3/0091; B05C 3/10; B05C 5/005; B05C 5/008
USPC .................................. 118/13, 16, 24, 30, 31
See application file for complete search history.

(56) References Cited

FOREIGN PATENT DOCUMENTS

| | | |
|---|---|---|
| EP | 1582100 A1 | 10/2005 |
| GB | 2159383 A | 12/1985 |
| WO | 9515669 A1 | 6/1995 |

OTHER PUBLICATIONS

International Search Report and Written Opinion from PCT Application No. PCT/NL2018/050862, dated Apr. 9, 2019.

* cited by examiner

APPARATUS FOR COATING A FOOD PRODUCT WITH A BATTER

TECHNICAL FIELD

The present disclosure relates to coating apparatus for coating a food product with a batter, comprising:
a frame supporting an endless conveyor belt having an upper transport run to advance food products from an entry section towards a discharge section thereof in a transport direction, the conveyor belt further having a lower return run, the conveyor belt extending between a front roller at a front end of the entry section and a rear roller at a rear end of the discharge section;
an upper batter applicator, wherein said upper batter applicator is positioned over the conveyor belt downstream of the entry section and configured to form, in operation, one or more curtains of batter flow from the upper batter applicator to the transport run of the conveyor belt in order to provide batter to an upper surface of the food products,
a batter pump assembly adapted to feed batter from a batter container to at least the upper batter applicator;
a wall structure provided at the front end adjacent
the conveyor belt and in proximity of the front roller configured to cause, in operation, batter to be dragged with the conveyor belt and/or the front roller upwards towards the entry section, characterized by
a batter overflow device below the entry section of the conveyor belt, the batter overflow device comprising a perforated surface having one or more perforations below at least a part of the entry section of the conveyor belt and a batter reservoir below said perforated surface,
wherein the batter pump assembly is further adapted to feed batter to the batter overflow device so that in operation batter flows through the perforated surface and forms a lower batter layer on top of said surface, and wherein the entry section passes through said lower batter layer.

The invention also pertains to a method for coating a food product with a batter and to a food processing line comprising such a coating apparatus.

BACKGROUND ART

A device of this kind is described in Canadian patent application CA1089217. The prior art device comprises an endless conveyor belt which is driven through a batter curtain for a top coating of batter while it provides an under bed of batter at the receiving end of the conveyor by driving the conveyor belt through its batter storage container directly under the transport run during its return run and by thrusting some batter up towards the receiving end by means of its driven roller. In practical operation this known configuration provides a layer of batter in the entry section of the belt. However, this effect is highly dependent on the viscosity of the batter, and may also be influenced by the belt speed. The inventors have observed that this mechanism provides insufficient control of the quality of the lower batter layer. A further drawback of the known device is that the configuration wherein the belt runs through the batter storage container imposes strict restrictions on the configuration of the system in that the storage must be in the path of the conveyor's return run.

It is therefore an object of the present invention to provide measures that allow for enhanced control of the formation of the lower batter layer.

SUMMARY OF THE INVENTION

In a first aspect of the present invention, the coating apparatus comprises a batter overflow device below the entry section of the conveyor belt, the batter overflow device (45, 46, 47) comprising a perforated surface having one or more perforations (46) below at least a part of the entry section of the conveyor belt and a batter reservoir below said perforated surface, and wherein the batter pump assembly is further adapted to feed batter to the batter overflow device so that in operation batter flows through the perforated surface and forms a lower batter layer on top of said surface, and wherein the entry section passes through said lower batter layer. A batter overflow device positioned at the entry section, upstream the upper applicator means and downstream the front roller in the first transport direction, which batter overflow device is mounted between the transport run and the return run of the conveyor belt, the batter overflow device is in fluid connection with the batter pump and configured to supply batter from the batter container to a lower surface of the food product. By thrusting up an amount of batter by means of the front roller belt support member and/or the conveyor belt, an amount of batter is provided on top of the conveyor belt before a food product is received thereon. This ensures some amount of batter coating on the lower side of the food product, at least on the locations thereof which are in contact with the conveyor belt. This is advantageous because these locations are normally not exposed, or not completely exposed to the subsequently applied batter supplies as they touch the conveyor belt. By supplying a further amount of batter just downstream of the front roller belt support on the lower side of the conveyor belt, this lower coverage of batter is further improved. In particular in cases of batter with lower viscosities, the amount of batter between the conveyor belt and the food product is normally quite small because of the aqueous character such batter may have. Further the additional batter overflow device adds to the coverage of the lower parts of the surfaces of the food product, in particular if the food product has a non-flat lower surface where not all parts of the lower surface touch the conveyor belt.

The coating apparatus having an endless conveyor belt to transport a food product from an entry section of the apparatus wherein the food product is received onto the conveyor belt towards a discharge section of the apparatus, wherein the food product is discharged from the coating apparatus. Discharging may be continuous, e.g. to a further inline apparatus such as a dry coating apparatus, or e.g. via a buffer such that a batch of products is transported further in a batch-wise fashion. The endless conveyor may be a single conveyor belt from entry to discharge section or may be an endless belt at the entry section which is part of a conveyor system through the apparatus with e.g. other endless belts and/or other transport means through the apparatus. The conveyor belt may be defined as having a transport run and a return run. The transport run of the conveyor belt is the portion of conveyor belt momentarily intended to transport a food product, while the return run is the portion of the conveyor belt momentarily returning back to the entry section.

The coating apparatus further comprises a batter pump to pump batter from a batter container towards the upper and/or batter overflow device. The batter pump may be any known pump which is able to pump a fluid such as batter from the batter container to the batter supply.

The entry section of the apparatus and of the conveyor belt are the sections wherein the food products are received from a supply, more particular, the areas wherein the food products are put onto the conveyor belt and is located upstream the upper batter supply. The front roller in or near the entry section engages with a local amount of batter by means of its own construction and/or by means of the conveyor belt to have a thrust on the batter. This may result in an explicit pumping function on the batter towards the entry section or may be any excitation of the batter present near the end of the return run around the conveyor belt support means.

The batter overflow device is positioned at the entry section, upstream the upper applicator means and downstream the front roller as seen in first transport direction, i.e. as seen in accordance with the intended path of a food product on the transport run of the conveyor belt. The food product is put on the conveyor belt in the entry section on top of the amount of batter which was deposited on or stuck to the conveyor belt. The batter overflow device is after the front roller but may be upstream the point where the food product hits the conveyor belt, such as to increase the amount of batter between the conveyor belt and the food product. Alternatively the drop point of the food product may also be chosen such that is it is dropped on the conveyor upstream of or substantially at the batter overflow device. For the purpose of this specification the location of the batter supply is defined as the location at which the batter is supplied to or towards the stream of food products. The actual unit itself, such as the container of ducts from which the batter is supplied may be positioned and/or extend further away from that location. It is therefore further advantageous that the additional batter overflow device may be used both to supplement the lower batter bed before receiving a food product on the conveyor and for supplying additional batter to the lower surfaces of food products already received on the conveyor.

It is noted that the term "food product" comprise a large range of different products. In particular it is intended to comprise at least products intended for human or animal consumption, such as protein based products of any origin and structure, such as e.g. minced, sliced, formed and/or whole muscle or organ products from e.g. poultry, fish, vegetable and/or other meat protein sources. The term "batter" is used herein as any fluid and/or paste like substance intended to coat the food product wholly or partially, e.g. to enable adhering a subsequent dry coating to the surface of the food product and/or to develop as a baked crust in a heat treatment. Batters may comprise e.g. milk, water, oil or any other suitable carrier fluid, optionally combined with e.g. flour, herbs, fragrances and the like. Examples of batter include general purpose batter, tempura batter and marinades.

In an embodiment of the coating apparatus according to the invention, the return run of the conveyor belt runs outside the batter container. The conveyor belt does not run through the batter container from which the batter pump pumps the batter to the batter supplies. Note that the conveyor belt may however run through batter during its run back to the entry section, but not the container from which the batter is pumped by the pump. This provides more flexibility for the layout of the machine while reducing potential contamination of the batter in the batter container from residues on the conveyor belt.

In an embodiment of the coating apparatus according to the invention, the batter overflow device comprises a container in between the transport run and the return run of the conveyor belt, wherein the container comprises a supply opening for supplying batter from the batter container by the batter pump into the batter overflow device container, and an opening adjacent the entry section of the transport run for outputting batter towards the transport run of the conveyor belt. The opening may be formed as one or more individual holes or may e.g. be formed as a slot over the width of the conveyor belt.

In an embodiment of the coating apparatus according to the invention, the apparatus further comprises a control valve in the fluid connection downstream the batter container and the batter pump for controlling the flows of batter towards the upper and batter overflow device. The control valve may be any suitable valve or valve assembly able to control the flow of fluid. This may e.g. be an on/off type or a continuously controllable type. The valve or valve assembly defines the amount of flow towards one or more batter supply locations and/or the ratio between them. The valve may be operated manually and/or automatically, e.g. by an electronic controller unit. The valve may e.g. be a two-way valve for individual ducts towards batter supply locations or a three-way valve which e.g. splits the flow of batter towards a first and second batter supply.

In an embodiment of the coating apparatus according to the invention, the apparatus further comprises a batter retaining member at least partially enclosing a lower portion of the front roller and extending under the return run of the conveyor belt. The batter retaining member catches at least a portion of the unused batter and enables the return run of the conveyor belt to urge portion of the batter retained thereon towards the entry section while covering at least a portion of the surface of the conveyor belt with batter. By partly enclosing the front roller, which is in this embodiment a driven conveyor belt support member, in particular the lower portion thereof, the batter is urged upwards towards the entry section when driven appropriately. In an alternative embodiment, the front roller is a freely rotatable roller and the conveyor belt is driven by a conveyor drive which engages the conveyor belt at another location.

In a further embodiment of the coating apparatus according to the invention, the retaining member extends substantially parallel to the return run of the conveyor belt until at least behind the upper applicator means in transport direction, such that at least a portion of the overplus of batter from the upper applicator means is, in operation, collected on the retaining member. This provides a substantially passive supply of batter onto the retaining member. A suitable retaining member could e.g. be a plate-like element, optionally partially perforated, strengthened and/or curved.

In an embodiment of the coating apparatus according to the invention, the conveyor belt comprises an open mesh wire belt configured to support the food product during its advance thereon and wherein the front roller is adapted to engage the open mesh wire belt by means of a toothing. Such open mesh wire belt is advantageous in order to provide support for the products to be coated while enabling the overplus of batter which is not used to coat the product, is able to fall through the mesh towards e.g. the retaining member and/or other collection element to remove the overplus of batter from the system or to recycle the batter via the batter pump to one of the batter supplies.

In an embodiment of the coating apparatus according to the invention, the upper applicator means comprise an overflow-type batter buffer positioned above the conveyor belt and wherein the batter buffer is configured to receive batter via the batter pump. Such overflow-type batter buffer collects batter which is pumped in via a batter supply until the batter reaches the upper edges of the buffer where it overflows. Typically via lateral plate elements which are placed at an angle with respect to the vertical, e.g. around 30-70 degrees, or more specific approximately 40-50 degrees, such as substantially 45 degrees. By continuously overflowing the buffer, a substantially continuous curtain of batter is formed, through which the food product travels such that exposed portions of the food product may be coated with batter of the batter curtain.

In a further embodiment of the coating apparatus according to the invention, the upper applicator means comprise a plurality of overflow-type batter buffers, wherein an upper batter buffer, in operation, cascades into one or more further batter buffers, wherein the batter buffers are positioned offset each other in transport direction, such that, in operation, the batter flows onto the conveyor belt in a plurality of individual flows of batter.

In an embodiment of the coating apparatus according to the invention, the apparatus further comprises means for removing excess batter from the food product, wherein the means for removing excess batter are positioned downstream the upper batter applicator means.

In a further embodiment of the coating apparatus according to the invention, the means for removing excess batter comprise an air knife aimed towards the advancing food product. The air knife or plurality of air knives may be adjustable, e.g. in direction and/or amount of air flow.

In a further embodiment of the coating apparatus according to the invention, the upper batter applicator means comprise venting means for guiding a flow of air away from the flow of batter. There may be some airflow from miscellaneous sources such as an air knife that may disturb the flow of batter. By applying venting means the airflow may be diverted away from the batter flow such that the flow of batter is less disturbed and the chances of incomplete coverage of batter to the food product is reduced.

In a second aspect of the present invention, a method is provided for coating a food product with a batter in an apparatus comprising a frame supporting an endless conveyor belt (15, 15') having an upper transport run (15) on which food products are received and advanced from an entry section (A, B) towards a discharge section (D) thereof in a transport direction (T);
batter is applied on the food products from an upper batter applicator (40), wherein said upper batter applicator is positioned over the conveyor belt downstream of the entry section and configured forming one or more curtains of batter flow from the upper batter applicator to the transport run (15) of the conveyor belt providing batter to an upper surface of the food products, wherein the batter is from a batter container (51) by a batter pump assembly (50);
a wall structure (17) provided at the front end adjacent the conveyor belt and in proximity of the front roller (16) aids in batter to be dragged with the conveyor belt and/or the front roller upwards towards the entry section;
a batter overflow device below the entry section of the conveyor belt, the batter overflow device (45, 46, 47) comprising a perforated surface having one or more perforations (46) below at least a part of the entry section of the conveyor belt and a batter reservoir below said perforated surface,
the method further comprises the step of feeding batter to the batter overflow device such that in operation batter overflows through the perforated surface and forms a lower batter layer on top of said surface.

In another aspect of the present invention, a food processing line is provided, comprising a conveyor system for advancing a stream of subsequent food products from a food product supply apparatus and a dry coating apparatus for applying a layer of substantially dry coating material to the stream of subsequent food products and/or a heat treatment device for applying a heat treatment to the stream of food products and/or a packaging machine for packaging individual food products and/or a set of food products, characterized in that it further comprises an apparatus for coating a food product with a batter in accordance with a coating apparatus of the first aspect of the present invention, wherein the apparatus for coating a food product with a batter is positioned upstream the dry coating apparatus.

BRIEF DESCRIPTION OF THE DRAWINGS

Further scope of applicability of the present invention will become apparent from the detailed description given hereinafter. However, it should be understood that the detailed description and specific examples, while indicating embodiments of the invention, are given by way of illustration only, since various changes and modifications within the scope of the invention will become apparent to those skilled in the art from this detailed description and the accompanying schematic drawings which are not limitative of the present invention, and wherein.

DETAILED DESCRIPTION OF EMBODIMENTS

Figure 1:
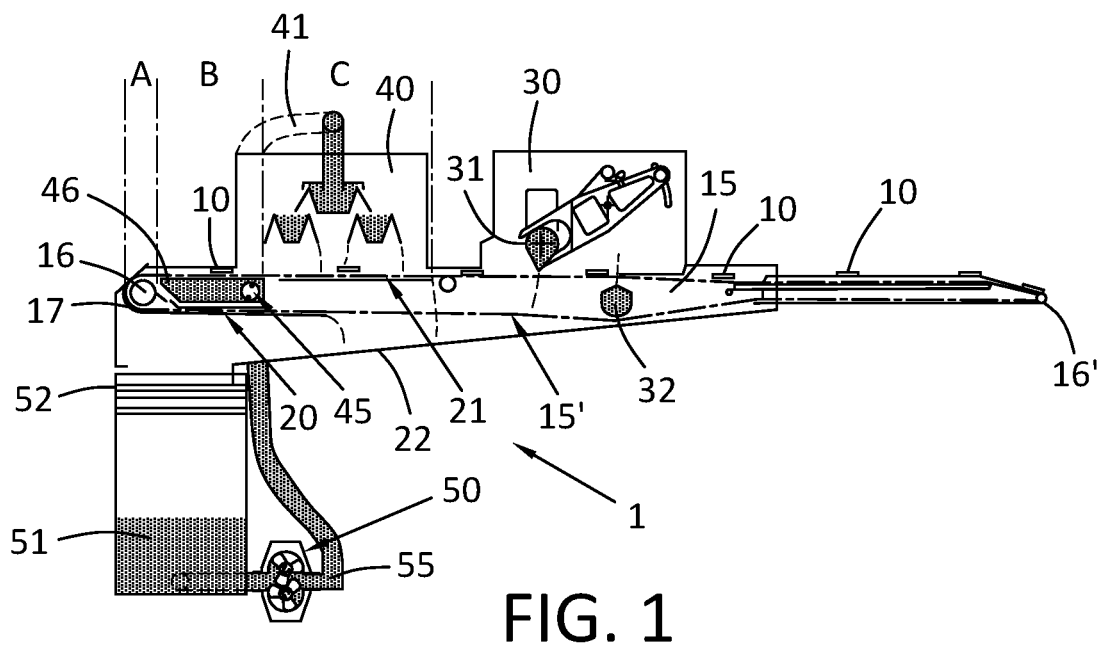
FIG. 1 is a schematic cross-sectional view of an apparatus for coating a food product with a batter according to the present invention.

The present invention will now be described with reference to the accompanying drawings, wherein the same reference numerals have been used to identify the same or similar elements throughout the several views.

It is noted that the drawings are schematic, not necessarily to scale and that details that are not required for understanding the present invention may have been omitted. The terms "upward", "downward", "below", "above", and the like relate to the embodiments as oriented in the drawings, unless otherwise specified. Further, elements that are at least substantially identical or that perform an at least substantially identical function are denoted by the same numeral, where helpful individualised with apostrophe suffixes.

FIG. 1 schematically illustrates an example of an apparatus 1 for coating a food product with a batter. An open mesh wire belt conveyor runs between a first belt support member 16 and a second remote support roller 16' over a plurality of rotatable support members there between. The first belt support member 16 is driven by electric motor 61 and in this cross-sectional view, the conveyor belt runs in clockwise direction. A stream of individual food products 10 are deposited onto the conveyor belt 15. The upper portion of the conveyor belt 15 on which the food products are transported from the entry section on the left towards the discharge section on the right is the transport run 15 of the conveyor belt. The lower portion which returns the belt towards the entry section is called the return run 15'.

Batter is stored in the batter container 51. In the shown embodiment, a single batter pump 50 pumps batter from the container 51 to two batter application locations; the upper batter application means 40 via batter duct 41 and the lower batter application means in area A of the conveyor belt via pump duct 55. Possibly, a valve system is provided to divide the batter between batter duct 41 and pump duct 55. Alternatively, not shown, it is also conceivable that separate pumps are provided to pump batter from the container 51 to the two batter application locations. The lower batter application means comprise two sources of batter; some amount of batter is transported from retainer plate 20 by means of the open mesh wire belt to the curved bend 17 of the retainer plate 20, such that a layer of batter sticks to the belt at the start of the transport run thereof. The driven roller 16 comprises a toothing that engages with the open mesh wire belt such that the belt is driven and also such that the batter is urged through the bend 17 such that the belt imposes thrust on the batter towards the entry section. A second source of batter at the entry section of the belt is fed by the batter pump 50 via pump duct 55 towards a batter enclosure 45 under the entry section of the belt. The batter enclosure is a box shaped enclosure having a slit 46 in the top section thereof over the whole width of the conveyor belt. Via this supply slit 46 an amount of batter, fed by the batter pump 50 is supplied towards the underside of the conveyor belt. This lower bed of batter is formed at the start of the transport run of the conveyor such that food products receive an amount of batter on their bottom surfaces and even on the lower portions of the bottom surfaces that touch the conveyor belt. The entry section of the conveyor belt is indicated by the combined areas A and B. In section C the subsequent food products are fed through four curtains of batter supplied by the upper batter application means 40. The batter coated food products are subsequently fed through an air knife unit 30 comprising an upper air knife 31 and a lower air knife 32. These air knifes are controllably configurable in terms of air flow direction and amount of air flow. The air knifes may also be switched off depending on the requirements of the specific application. After the air knife unit 30 the food products 10 are transported towards the discharge section of the belt near roller 16'. The food products may be transported and/or deposited onto a further system, e.g. a crumb unit for further coating the products, a heating unit such as a fryer and/or oven or e.g. towards a packaging unit. The conveyor belt returns towards roller 16 via the return run 15'. As illustrated in FIG. 1, under the upper batter application means, a retainer plate 21 has been mounted in the frame. Excess batter will drop at the end of the retainer plate 21 onto retainer plate 22. Optionally, retainer plate 21 is provided with an opening of adjustable size to allow excess batter to drop onto the retainer plate 22. The size of the opening may be adjustable manually or automatically, preferably during operation. It is also conceivable that the size of the opening is controlled by a control unit which controls the process. Retainer plate 22 will also receive excess batter from behind the lower batter application means and the batter will run via batter filters 52 back into the batter container 51. Alternatively, depending on the food safety situation of the specific application, the excess batter may of course also be taken out of the circuit in order not to pollute the batter in the batter container.

The batter transport ducts 55, 41 comprise control valves in order to control the amount of batter to the upper and lower batter application means. In particular in case of low viscous aqueous batter, the amount of batter thrusted upwards at bend 17 towards the entry section will be relatively limited, and therefore the additional dosing of batter from below the open mesh wire belt 15 by the lower batter application means 46 may improve the lower coating quality of the food products.

Figure 2:
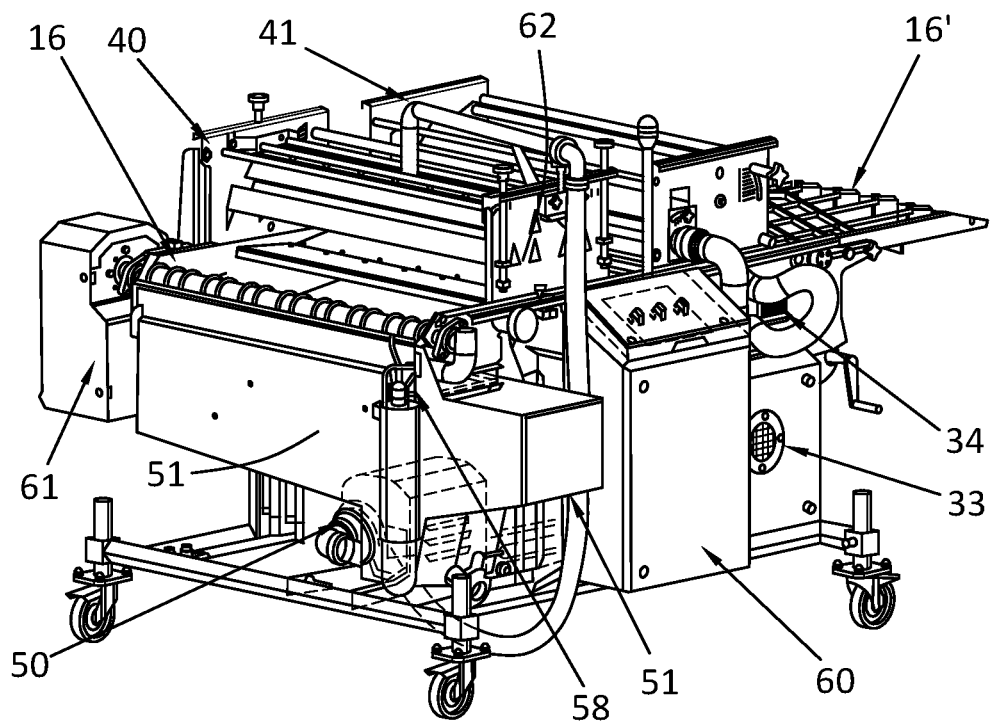
FIG. 2 is a schematic perspective view of an apparatus for coating a food product with a batter according to the present invention.

As depicted in schematic perspective view of FIG. 2, the system comprises a controller unit 60 which controls process and belt speeds, the amount of batter pumped by the batter pump 50 and the distribution thereof. It further controls the air knives by controlling the air pump 33 which pumps ambient air via air ducts 34 to the upper and lower air knife 31, 32. The frame of the upper batter application means comprises venting means 62 via which excess air may escape such that this air flow does not negatively influences the quality of the batter flow at the batter curtains. The control unit 60 further comprises operator interaction buttons to start, pause and stop the system as well as an emergency brake button. The complete frame is mounted on transport wheels in order to simplify the modular employment of this wet coating unit 1. The batter container may be refilled in a batch wise fashion of continuously by means of batter supply connector 58.

Figure 3:
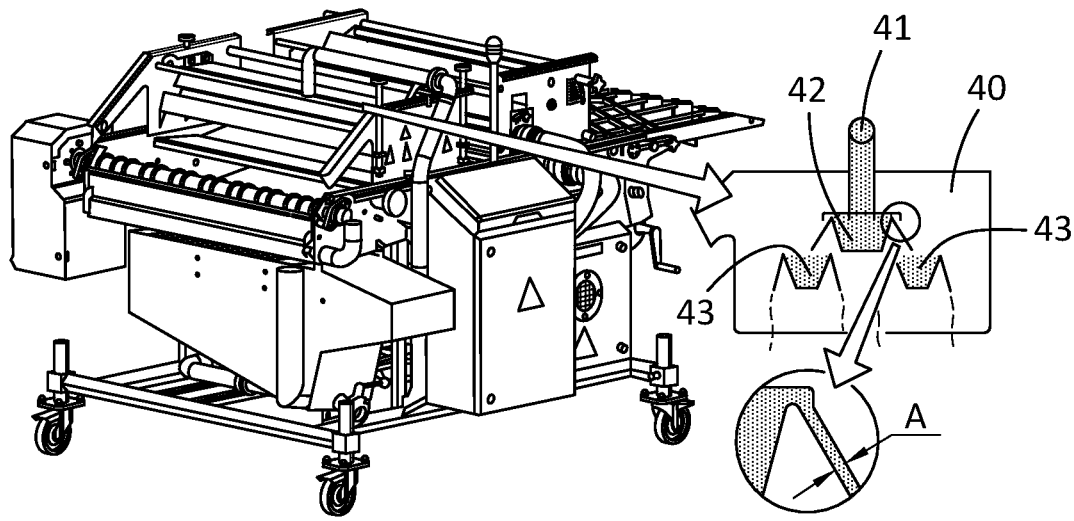
FIG. 3 is a schematic perspective view of an apparatus as illustrated in FIG. 2 with a detail of the cascading upper batter application means.

FIG. 3 shows a further detail of the cascading upper batter application means. The batter pump pumps batter to the upper batter application means by pumping batter from the supply duct 41 into the upper batter buffer 42. This batter buffer 42 is an box shaped container, open and its top surface to the batter supply duct 41 and extending over the width of the conveyor belt 15 and having a little overhang on both sides of the belts width. The batter is supplied into the batter buffer 42 and flows over the edges after being completely filled. The side edges are formed as angled flaps over which the batter flows into the two lower batter buffers 43. Here the process of the upper batter buffer is generally repeated which results in four laminar batter curtains having a thickness A. The flow of batter flows from the batter buffers 43 toward the conveyor belt where it is received by either a food product or onto a retainer plate as excess batter.

Figure 4:
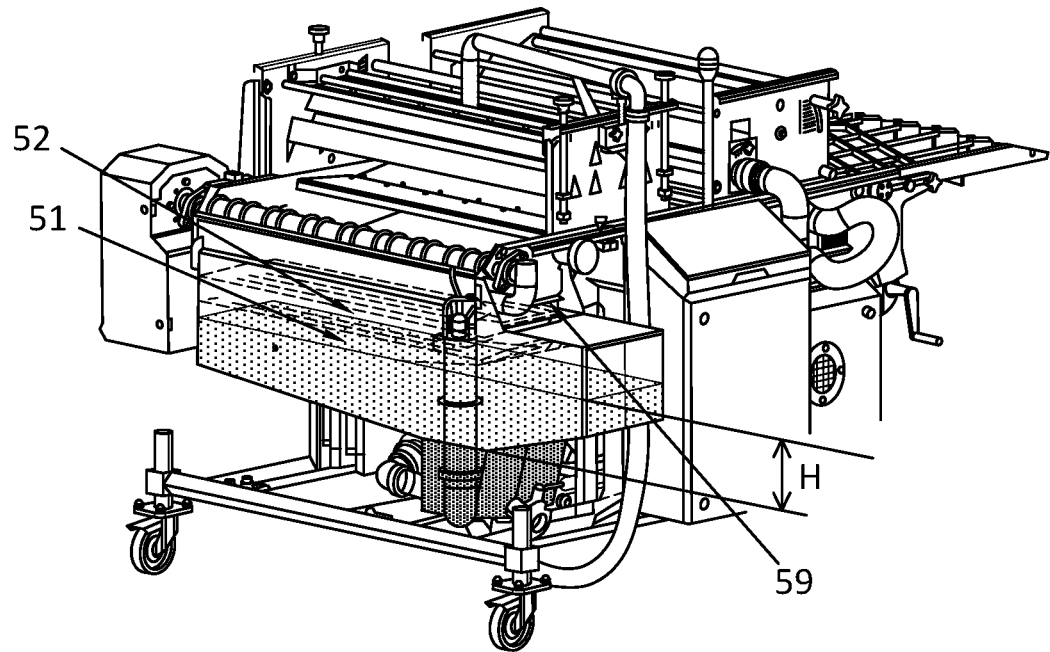
FIG. 4 is a schematic perspective view of an apparatus for coating a food product with a batter according to the present invention.
Figure 5:
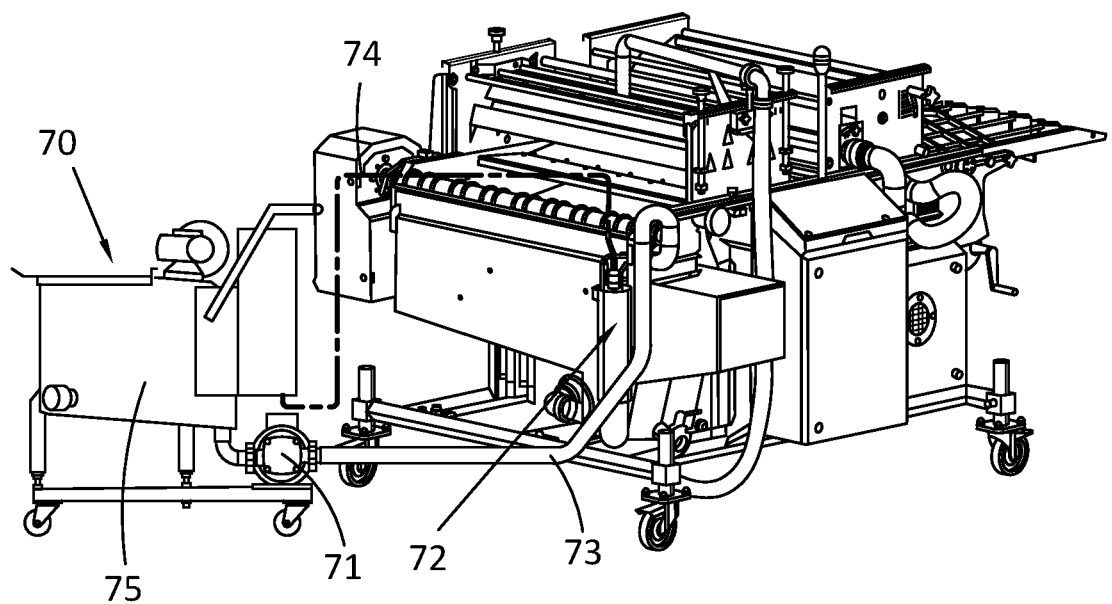
FIG. 5 is a schematic view of an apparatus for coating a food product with a batter according to the present invention in conjunction with a batter mixer device and associated pump.

In FIG. 4 the batter container 51 is filled with batter having a height H in the container 51. The container is filled by an initial amount of externally mixed batter and by the recycling batter from the retainer plates 22 via the batter filters 52. The container 51 comprises measurement means 59 for measuring the level of batter inside of the batter container 51, such that an audible and/or visible alarm is provided to the operator before the batter in the container runs out. In case the batter needs to be refilled as depicted in FIG. 5, a batter mixer device 70 and associated pump 71 is connected to the batter applicator unit 1. In mixer tub 75 an amount of liquid and dry ingredients may be mixed in accordance with any desired batter recipe by means of the mixer means inside of the mixer tub 75. After a certain amount of time, of after a certain state of the batter is reached, the batter may be pumped by the mixer pump 71 via duct 73 into the batter container 51 via batter supply connector 58. A control unit 72 is connected to a signal cable 74 which may also carry a power line for the batter mixer. The control unit is used to control the preparation and transport of the batter from the batter mixer 70 into the batter container 51.

Figure 6:
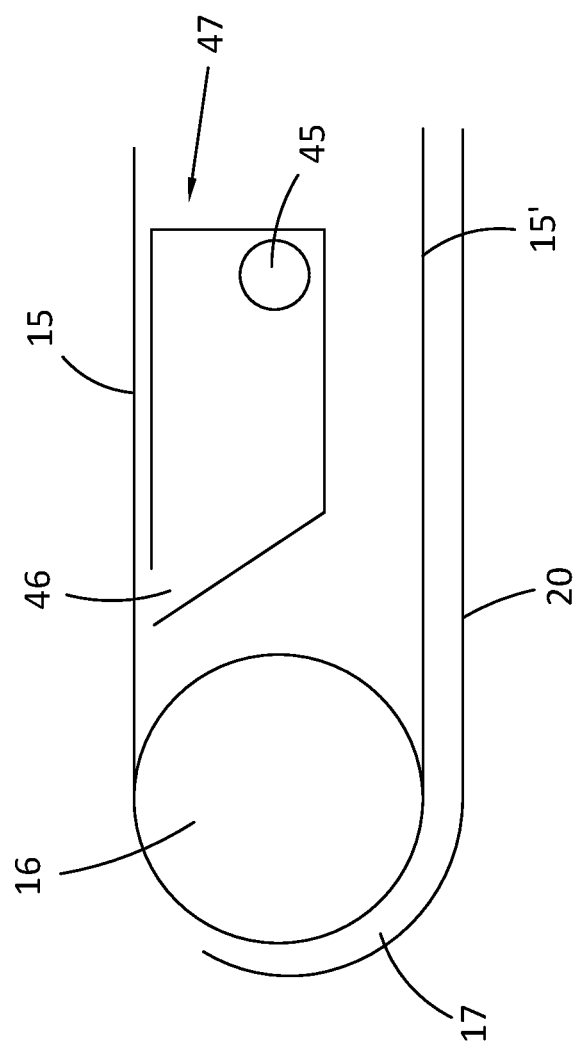
FIG. 6 is a schematic detail view of the batter overflow device.

FIG. 6 shows a schematic detail of the batter overflow device 47. The conveyor belt 15 runs over front roller 16. An amount of excess batter (not shown) is supported by support member 20, while the return run of the conveyor belt 15' and/or the front roller 16 progress some of that batter via curved plate 17 around the front roller towards the entry section of belt 15. Under the upper transport run of belt 15 a batter overflow device is mounted. The batter pump assembly feeds batter to the upper batter applicator and to the supply 45 of the batter overflow device 47. The overflow device in this embodiment comprises a slit shaped perforation 46 over the width of the conveyor belt. When the overflow device is filled with batter via the supply 45 it overflows via the perforation towards the conveyor belt 15, which is a perforated wire mesh belt such that the batter flows through the conveyor belt 15 towards the lower side of the food products on the conveyor belt 15. The overflow device 47 may overflow smoothly or may thrush the batter with force out of the perforation, which may result in a fountain-like application of batter, spraying of the batter towards the lower surfaces of the food products.

Further, the terms and phrases used herein are not intended to be limiting; but rather, to provide an understandable description of the invention. The terms "a" or "an", as used herein, are defined as one or more than one. The term "plurality", as used herein, is defined as two or more than two. A plurality may also indicate a subset of two or more, out of a larger multitude of items. The term "another", as used herein, is defined as at least a second or more. The terms including and/or having, as used herein, are defined as comprising (i.e., open language). The term "coupled", as used herein, is defined as connected, although not necessarily directly. The term "fluid" as used herein, is defined as any flowable material that can be dispensed by the apparatus according to the present invention. Examples of fluids include liquids, pastes, and the like. "Conveyor belt" may be a single belt running in between two or more rollers, but may also be formed by a plurality of individual belts or other transport means. The term "batter" is used herein as any fluid and/or paste like substance intended to coat the food product wholly or partially, e.g. to enable adhering a subsequent dry coating to the surface of the food product and/or to develop as a baked crust in a heat treatment. Batters may comprise e.g. milk, water, oil or any other suitable carrier fluid, optionally combined with e.g. flour, herbs, fragrances and the like. Examples of batter include general purpose batter, tempura batter and marinades.

Elements and aspects discussed for or in relation with a particular embodiment may be suitably combined with elements and aspects of other embodiments, unless explicitly stated otherwise. The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

The invention claimed is:

1. A coating apparatus for coating food products with a batter, comprising:
    a frame supporting a conveyor belt and having a transport run to advance food products from an entry section towards a discharge section thereof in a transport direction, the conveyor belt further having a return run, the conveyor belt extending between a front roller at a front end of the entry section and a rear roller at a rear end of the discharge section;
    an upper batter applicator, wherein said upper batter applicator is positioned over the conveyor belt downstream of the entry section and configured to form, in operation, one or more curtains of batter flow from the upper batter applicator to the transport run of the conveyor belt in order to provide batter to an upper surface of the food products;
    a batter pump adapted to feed batter from a batter container to at least the upper batter applicator;
    a wall structure provided at the front end adjacent the conveyor belt and in proximity of the front roller configured to cause, in operation, batter to be dragged with the conveyor belt and/or the front roller upwards towards the entry section;
    wherein a batter overflow device below the entry section of the conveyor belt, the batter overflow device comprising a perforated surface having one or more perforations below and adjacent the entry section of the conveyor belt and a batter reservoir below said perforated surface, the perforated surface is arranged to apply batter to the conveyor belt at a location at the entry section upstream where food products are initially received by the conveyor belt and the upper batter applicator;
    wherein the batter pump is further adapted to feed batter to the batter overflow device so that in operation batter flows through the perforated surface and forms a lower batter layer on top of said perforated surface; and
    wherein the entry section passes through said lower batter layer such that the entry section is arranged to receive the food products on top of the lower batter layer.

2. The coating apparatus according to claim 1, wherein a return run of the conveyor belt runs outside the batter container.

3. The coating apparatus according to claim 1, wherein the batter overflow device comprises an overflow container in between the transport run and a return run of the conveyor belt,
    wherein the overflow container comprises a supply opening for supplying batter from the batter container by the batter pump into the overflow container, and an opening adjacent the entry section of the transport run for outputting batter towards the transport run of the conveyor belt.

4. The coating apparatus according to claim 1, further comprising a control valve in the fluid connection downstream the batter container and the batter pump for controlling flows of batter towards the batter overflow device.

5. The coating apparatus according to claim 1, further comprising a batter retaining member at least partially enclosing a lower portion of the front roller and extending under the return run of the conveyor belt.

6. The coating apparatus according to claim 5, wherein the retaining member extends substantially parallel to the return run of the conveyor belt until at least behind the upper applicator in transport direction, such that at least a portion of an overplus of batter from the upper applicator is, in operation, collected on the retaining member.

7. The coating apparatus according to claim 1, wherein the conveyor belt comprises an open mesh wire belt configured to support the food product during its advance thereon and wherein the front roller is adapted to engage the open mesh wire belt by a toothing.

8. The coating apparatus according to claim 1, wherein the upper applicator comprises an overflow-type batter buffer positioned above the conveyor belt and wherein the batter buffer is configured to receive batter via the batter pump.

9. The coating apparatus according to claim 8, wherein the upper applicator comprises a plurality of overflow-type batter buffers,
    wherein an upper batter buffer, in operation, cascades into one or more further batter buffers;
    wherein the upper batter buffer and one or more further batter buffers are positioned offset each other in transport direction, such that, in operation, the batter flows onto the conveyor belt in a plurality of individual flows of batter.

10. The coating apparatus according to claim 1, further comprising means for removing excess batter from the food product, wherein the means for removing excess batter are positioned downstream the upper applicator.

11. The coating apparatus according to claim 10, wherein the means for removing excess batter comprise an air knife aimed towards the advancing food product.

12. The coating apparatus according to claim 11, wherein the upper applicator comprises venting means for guiding a flow of air away from a flow of batter.

* * * * *